(12) United States Patent
Meijer et al.

(10) Patent No.: US 7,716,656 B2
(45) Date of Patent: *May 11, 2010

(54) NULLABLE AND LATE BINDING

(75) Inventors: Henricus Johannes Maria Meijer, Mercer Island, WA (US); Amanda Silver, Seattle, WA (US); Brian C. Beckman, Newcastle, WA (US); Paul A. Vick, Seattle, WA (US); Avner Y. Aharoni, Seattle, WA (US); David N. Schach, Redmond, WA (US); Peter F. Drayton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

This patent is subject to a terminal disclaimer.

(21) Appl. No.: 11/215,178

(22) Filed: Aug. 30, 2005

(65) Prior Publication Data

US 2007/0050380 A1   Mar. 1, 2007

(51) Int. Cl.
G06F 9/45    (2006.01)
(52) U.S. Cl. ...................................... 717/148
(58) Field of Classification Search ......... 717/162–165, 717/143, 148; 707/2, 4
See application file for complete search history.

(56) References Cited

U.S. PATENT DOCUMENTS

| | | | |
|---|---|---|---|
| 5,590,324 A | 12/1996 | Leung et al. | |
| 5,864,840 A * | 1/1999 | Leung et al. | 707/2 |
| 6,094,664 A | 7/2000 | Ungar | |
| 6,272,488 B1 | 8/2001 | Chang et al. | |
| 6,321,374 B1 | 11/2001 | Choy | |
| 6,385,769 B1 | 5/2002 | Lewallen | |
| 6,405,363 B1 | 6/2002 | Carlson et al. | |
| 6,654,760 B2 | 11/2003 | Baskins et al. | |
| 6,735,587 B2 | 5/2004 | Colby et al. | |
| 6,996,557 B1 * | 2/2006 | Leung et al. | 707/4 |
| 7,082,455 B2 | 7/2006 | Hu | |
| 7,318,075 B2 | 1/2008 | Ashwin | |
| 2003/0135788 A1 | 7/2003 | Prakash | |
| 2004/0046787 A1 | 3/2004 | Henry | |
| 2004/0107227 A1 | 6/2004 | Michael | |
| 2004/0194058 A1 | 9/2004 | Meijer | |
| 2005/0177581 A1 | 8/2005 | Sezgin | |
| 2006/0015528 A1 | 1/2006 | Hejlsberg et al. | |
| 2006/0053138 A1 | 3/2006 | Meijer | |
| 2006/0085342 A1 | 4/2006 | Chen | |
| 2006/0085400 A1 | 4/2006 | Minore | |
| 2008/0141266 A1 | 6/2008 | Hunt | |

OTHER PUBLICATIONS

Bradley Jones, "Using Nullable Types in C#", Aug. 17, 2005, p. 1-4 (UsingNullable_BJ.pdf).*

ECMA-334, C# Language Specification, ("Nullable Types" , msdn.com, Jun. 2005—also as Information Disclosure Statement,—herein ECMA_334, provided as ECMA_334.pdf (pp. 1-16).*

(Continued)

*Primary Examiner*—Tuan Anh Vu
(74) *Attorney, Agent, or Firm*—Workman Nydegger (57) ABSTRACT

Systems and methods that enhance a programming language by introducing null unification on a type level in addition to a value level, for static types of both reference and value types T. An operator that adds a level of nullability (and removes such nullability) is introduced without a mention of the actual type, to steer overloading in a precise manner.

11 Claims, 9 Drawing Sheets

| Static Type | Dynamic Type |
|---|---|
| Tv, where Tv is a value type | Tv |
| Nullable (Of Tv), where Tv is a Value type | Tv |
| Tr where Tr is a reference type | Tr |
| Nullable (Of Tr), where Tr is a Value type | Tr |

OTHER PUBLICATIONS

Padovani, et al. "A Generative Approach to the Implementation of Language Bindings for the Document Object Model*", In Generative Programming and Component Engineering: Third International Conference, GPCE 2004, Lecture Notes in Computer Science (LNCS), 2004, 469-487, vol. 3286.

http://sourceforge.net/forum/message.php?msg_id=2582256, last accessed Dec. 1, 2005, 6 pages.

Mark Davydov, "SOA Adventures, Part 1: Ease Web Services Invocation With Dynamic Decoupling", Apr. 29, 2005, 9 pages, accessible at: http://www-128.ibm.com/developerworks/webservices/library/ws-soa-adventure/, last accessed Dec. 1, 2005.

"Nullable Types", 3 pages, accessible at: http://msdn.microsoft.com/vcsharp/2005/overview/language/nullabletypes/, last accessed Dec. 1, 2005.

"Transcript: Whiteboard with Anders Hejlsberg", 20 pages, accessible at: http://msdn.microsoft.com/msdntv/transcripts/20040624csharpahTranscript.aspx, last accessed Dec. 1, 2005.

International Search Report dated Jan. 23, 2007 for International Application No. PCT/US2006/030589, 4 pages.

M. Hofman and B.C. Pierce. A Unifying Type-theoretic Framework for Objects. Journal of Functional Programming, Cambridge University Press, 1993. 42 Pages.

Jurg Gutknecht. Oberon as an Implementation Language for COM Objects. Microsoft Research, 1998. 22 Pages.

G. Bracha, M. Odersky, D. Stoutamire, and P. Wadler. Making the Future Safe for the Past: Adding Genericity to the Java Programming Language. Proceedings of the 13th ACM SIGPLAN Conference, pp. 183-200, 1998.

M. Fahndrich and K.R.M. Leino. Declaring and Checking Non-null Types in an Object-Oriented Language. Proceedings of the 18th ACM SIGPLAN Conference, pp. 302-312, 2003.

C# Version 2.0 Specification, Published: May 2004 by Microsoft Corporation, pp. 1-100.

Meijer, et al. Unifying Table, Objects and Documents. Published 2003, pp. 1-11.

Notice of Allowance dated Jul. 17, 2009 cited in U.S. Appl. No. 11/214,583.

Office Action dated Sep. 18, 2007 cited in U.S. Appl. No. 10/935,247.

Office Action dated Mar. 19, 2008 cited in U.S. Appl. No. 10/935,247.

Office Action dated Dec. 24, 2008 cited in U.S. Appl. No. 10/935,247.

Notice of Allowance dated Jun. 8, 2009 cited in U.S. Appl. No. 10/935,247.

Office Action dated Oct. 22, 2007 cited in U.S. Appl. No. 11/214,583.

Office Action dated Apr. 15, 2008 cited in U.S. Appl. No. 11/214,583.

* cited by examiner

| Static Type | Dynamic Type |
|---|---|
| Tv, where Tv is a value type | Tv |
| Nullable (Of Tv), where Tv is a Value type | Tv |
| Tr where Tr is a reference type | Tr |
| Nullable (Of Tr), where Tr is a Value type | Tr |

```
Function F (Of T)
(X As T) As T?
Return X?
End Function
```

NULLABLE AND LATE BINDING

BACKGROUND

As programming approaches and foundations have evolved, application programming interfaces (APIs) and programming schemas have been developed to standardize and unify programming methodologies that were previously multi-variant and relatively incompatible. Modem programming therefore often involves employing APIs and schemas in conjunction with reusable libraries. Such Programming languages continue to evolve to facilitate specification by programmers as well as efficient execution.

Compilers and/or interpreters bear the burden of translating high-level logic into executable machine code. In general, a compilers and/or interpreters are components that receive a program specified in a source programming language (e.g., C, C#, Visual Basic, Java . . . ) and covert the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software programs.

Typically for Common Language Runtime (CLR), data types can be value types or reference types. Reference types are variables that are stored on a heap and referenced by a pointer stored on the stack or inside another object in the heap. Value types are variables that are stored directly on the stack. Consequently, variables that are represented as reference types can be uninitialized (termed "null"), but variables that are represented as value types cannot be established in an uninitialized condition without risking indeterminate or even catastrophic results. Put differently, a value type cannot be null because there is always a value, and cannot be expressed as null.

For example, if statically it is known that
Dim $X$ As Nullable (of Int)=Nothing ("Null")
Dim $Y$ As Nullable (of Int)=5
Dim $Z=X+Y$ $Z$ has the type Nullable (of Int) and has a value of nothing, e.g. via three—valued, or null-propagating, logic. Yet, and as will be described in detail infra, such can create problems in late bindings.

Moreover, support for nullability across all types, including value types, is essential when interacting with null supported languages, such as database languages (e.g., SQL). A database language can employ a null value to indicate that the actual data value is unknown or missing. By providing null support within a general purpose programming language null-supported languages and programming languages may be integrated (e.g., code in the C# programming language may read, write or interpret nullable fields in a database language). The nullification problem has been previously addressed with many different strategies. Examples of such strategies include tuples, variants, convoluted pointer manipulations, and boxing. However, each of these strategies has one or more drawbacks.

For example, boxing is an implicit conversion of a value type to the type object or to any interface type implemented by this value type. Put differently, a value type that exists on a stack and obtain a pointer to a heap with a reference. Boxing a value of a value allocates an object instance and copies the value into the new object. Likewise, unboxing is an explicit conversion from the type object to a value type or from an interface type to a value type that implements the interface. An unboxing operation typically consists of: checking the object instance to make sure it is a boxed value of the given value type, and copying the value from the instance into the value-type variable.

Now consider the example of boxing a nullable. Typically, the manner a nullable is implemented is via a structure that has a Boolean and value. This is achieved by automatically creating a multi-element structure including an element for the underlying value and a Boolean element representing whether or not the underlying value is null (e.g., flag indicating null or non-null value for the underlying type). If the Boolean element is declared false for example, the underlying type is considered null, whereas if the Boolean element is true for example, the value contained in the underlying value is considered the value of the nullable type variable.

For example, "nothing" has no value, and/or value can be ignored. As explained earlier, "5" of type nullable can be represented by a pair of boolean, which is not null and has a value of "5". As such, the implementation for representing a nullable is via a structure that has a boolean and a value. Moreover, considering a scenario of boxing a value "3", on the heap a reference to the value 3 can be obtained. Likewise, when boxing the value of "true, 5"—it is intuitively expected that there is a pointer to the heap that can contains "true" and 5.

Yet, to box "nothing" and "false", then an inconsistency occurs, because a reference is created to an actual thing, when in fact the starting point was a "nothing". For example, the thing that has been referenced to does not represent "nothing" for a reference type. Put differently, the starting point is an empty set, yet the outcome is a set that contains the empty set, and such represents an incorrect out come.

Moreover, in a heap a distinction can be made between a boxed item and an integer, yet a differentiation between "nothing" and the box "nothing" can be made, which is undesirable. Accordingly, if boxing a nullable type is desired (if it is "true" and has a value), such can be removed and boxed in manner wherein the boxing is aware of nullability.

An additional problem exists now that there is no trace that such previously existed as nullable, as the representation of a boxed nullable (int.) is the same as a representation of a boxed int. Accordingly, one cannot distinguish between nullable (of T) and boxed T.

Put differently, reversal with fidelity when moving from a value type to an object via the boxing and vice versa for nullable types cannot be performed, and a distinction is lost. Such can introduce problems for late binding. Referring to the example of:

Dim $A$ As Object=$X$
Dim $B$ As object=$Y$—Such assignments cause boxing to occur from nullable to object.

Considering now the late-bound addition of Dim C=A+B, A can represent the no pointer (nothing) and B can be represented by the boxed 5. Yet, it is not known that A and B are nullables. As such, Visual Basic (VB) late bound addition will interpret nothing as zero and return a result of 5 instead of "nothing", which creates a difference in semantics depending on whether there is an early bound or a late bound. Such inconsistency is problematic and needs to be minimized. Put differently, the overload and compiler can statically resolve the three valued or null propagating logic as the types are known at compile time—yet, for late binding and resolving at runtime the knowledge of nullability is unavailable.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that enhance a programming language by introducing null unification on a type level in addition to a value level, for static types of both reference and value types T. An operator that adds a level of nullability (and removes such nullability) is introduced without a mention of the actual type, to steer static type overloading in a precise manner.

Accordingly, a new operation can be implemented for types and expressions (e.g., in form of a question mark "?") that identifies nullability, (and symbol "!" for removing nullability). For example, considering an expression E on type T, then E? indicates as nullable of T. "E?" operates on expressions and "T?" operates on types. As such, considering the example Dim C=A?+B, this indicates nullable of object+ object, wherein the compiler can now perform static overload resolution. Put differently by providing such operator, the programmer is enabled to change static type such that the overload resolution comes into play to perform the object?+ object, instead of object+object. Accordingly, the type name T need not be specified. Moreover, such can be provided in form of a toggle that also has an opposite conversion (e.g., expressed as E!).

In a related aspect if no runtime support is available (e.g., for nullability such as erasure of a nullable) a compiler can trace nullability representation, if T is a reference Type. If T is as a value type the following representations and type rules can be supplied:

$$\frac{E \text{ As } Tv}{E? \text{ As Nullable(of } Tv)}$$

and also $$\frac{E \text{ As Nullable(of } Tv)}{E! \text{ As } Tv}$$

(wherein, if T is value type representation of "?" is as Nullable).

As stated, if T is a reference type, then the compiler tracks the Nullable (e.g., via metadata, special metadata and the like) with no different runtime representation. As such it must be erased and a determination made at run time. If $$\frac{E \text{ As } Tr}{E? \text{ As Nullable(of } Tr)}$$

The run-time type is represented by Tr and the compiler maintains that it is nullable, and the type is erased to reference type—(As Nullable (of Tr) indicates an erasable representation and not represented by an actual type constructor), and the compiler tracks that it is nullable at compile time. Accordingly, there is no uniform representation for value type and reference type, and the compiler has to know the case, as it is hard wired into the compiler when there is no run-time support.

In a related aspect, if run time supported is provided, wherein typically at run time an instance of the nullable type is known. The instance type is of the form: S=Nullable (Of Nullable (Of . . . (Of T)), where T≠Nullable (Of . . . ) wherein there is a number of nullables and then at some point a type that is not nullable (e.g., a reference type or a value type). If T is reference type, then when creating type S, it can be represented S=T. As such, Nullable (Of Nullable (Of Object)) =Object, wherein the nullables are removed. If T is value type, then S=Nullable (Of T), thus Nullable (Of Nullable (Of Int)=Nullable (Of Int). Thus, with runtime support, all levels of nullable up to a value type can be erased, whenever the runtime attempts to instantiate a nullable type. For example, at for just-in-time (JIT) compilers/code generators, when an actual type is constructed, all type parameters are known, and hence the correct representation can be unambiguously selected.

As stated earlier, such requires runtime support, wherein at run time when the type is instantiated, the underlying execution mechanism knows about nullables, and can supply null unification. It is to be appreciated that a Static type Nullable (Of T) exists, but no such dynamic type nullable of (T).

Moreover, with runtime support the following generic nullable inducing function can be implemented (e.g., for joins and databases)

Function F (of T)
(X As T) As T?
Return X?
End Function

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
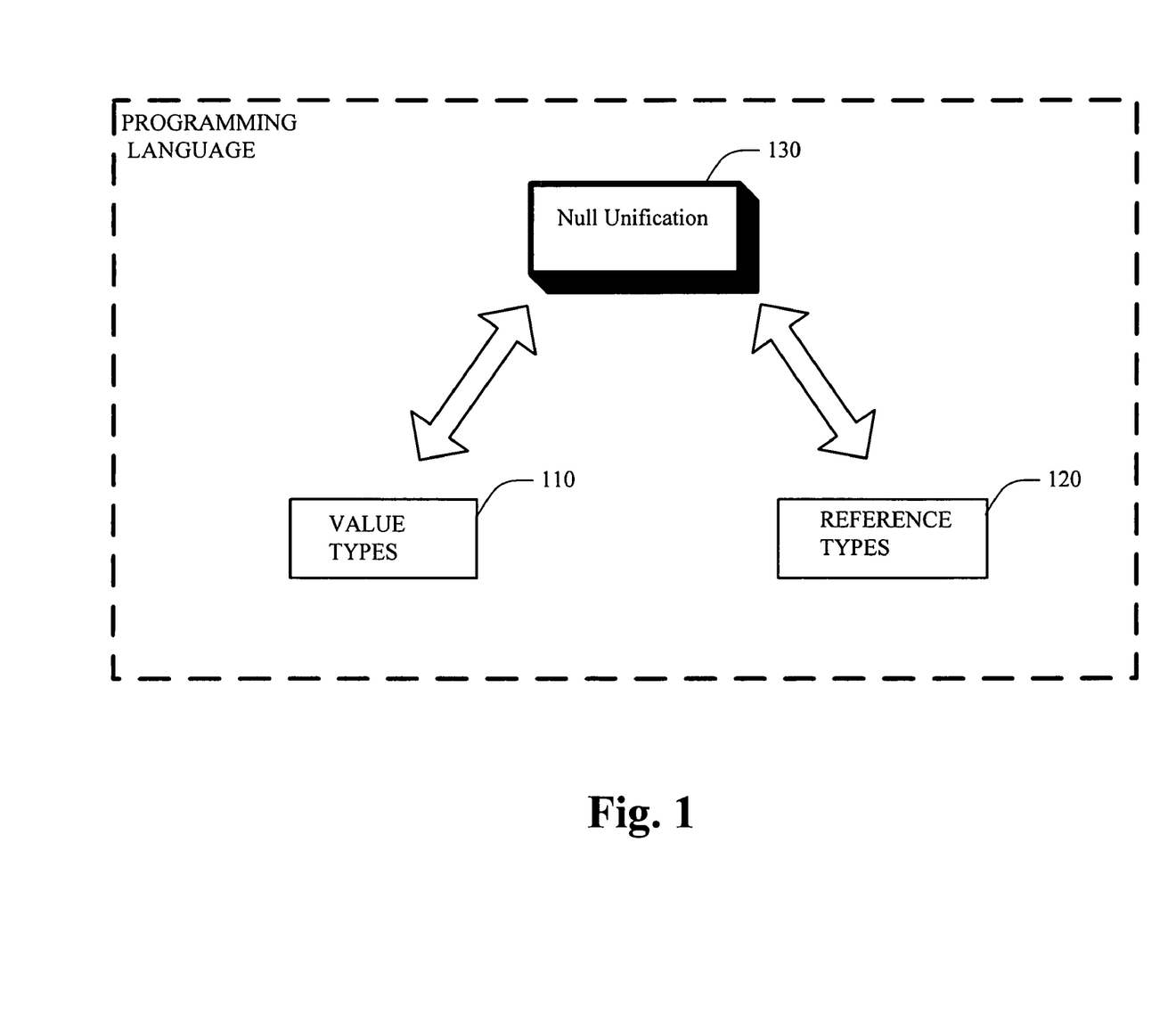
FIG. 1 illustrates a null unification component via which a programming environment can provide nullable type support, wherein a level of nullability can be added or removed without a mention of the actual type.

Turning initially to FIG. 1, a programming environment 100 is illustrated that includes a null unification component 130 via which the programming environment 100 can provide nullable type support for programming languages, wherein levels of nullability can be added or removed without a mention of the actual type, to steer static type overloading in a precise manner.

The system 100 includes one or more data structures that can be declared in the context of a programming language such as C, C++, C#, Pascal, Python, Ruby, Visual Basic, Java, and the like. The data structures can generally consist of an underlying type such as an integer, float, Boolean, and so forth that can be declared to be a nullable type by associating a type modifier with the underlying type. The null unification component 130 can enable a Nullable (Of T) as a static type for both value types 110, and reference types 120, as described in detail infra. Typically, the value type 110 describes a value that is represented as a sequence of bits stored on the stack. Likewise, reference types 120 can exist on a heap and supply a pointer. The null unification component 130 can supply an operator that adds a level of nullability (and removes such nullability) that is introduced without a mention of the actual type, to steer static type overloading in a precise manner. In general, overloading is the practice of supplying more than one definition for a given function name in the same scope. The compiler is left to pick the appropriate version of the function or operator based on the arguments with which it is called.

Figure 2:
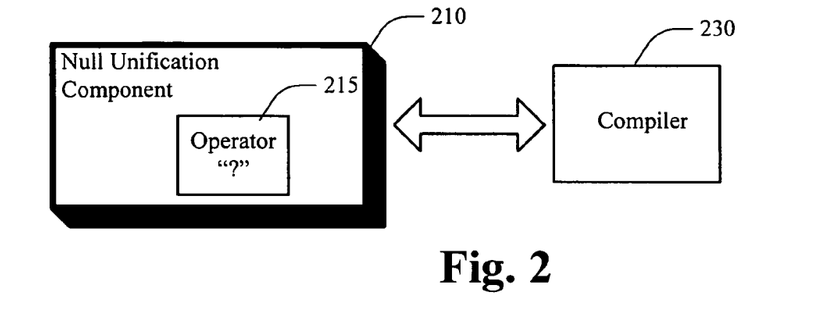
FIG. 2 illustrates an operator as part of the null unification component.

FIG. 2 illustrates an operator 215 as part of the null unification component 210. The operator 215 can employ a symbol such as "?" as a type modifier to indicate to a compiler 230 that the underlying type is to be considered a nullable type. It is to be appreciated that various other symbols can be employed as the type modifier.

Accordingly, a new operation can be implemented for types and expressions (e.g., in form of a question mark "?") that identifies nullability. For example, considering an expression E on type T, then E? indicates as nullable of T. As such, considering the example Dim C=A?+B, such can indicate nullable of object+object, wherein the compiler 230 can now perform static overload resolution. Put differently by providing such operator, the programmer is enabled to change static type such that the overload resolution enters to perform the object?+object, instead of object+object. Accordingly, the type name T need not be specified. Moreover, the modifier can be provided in form of a toggle, which also has an opposite conversion, such as one expressed as "!".

Figure 3:
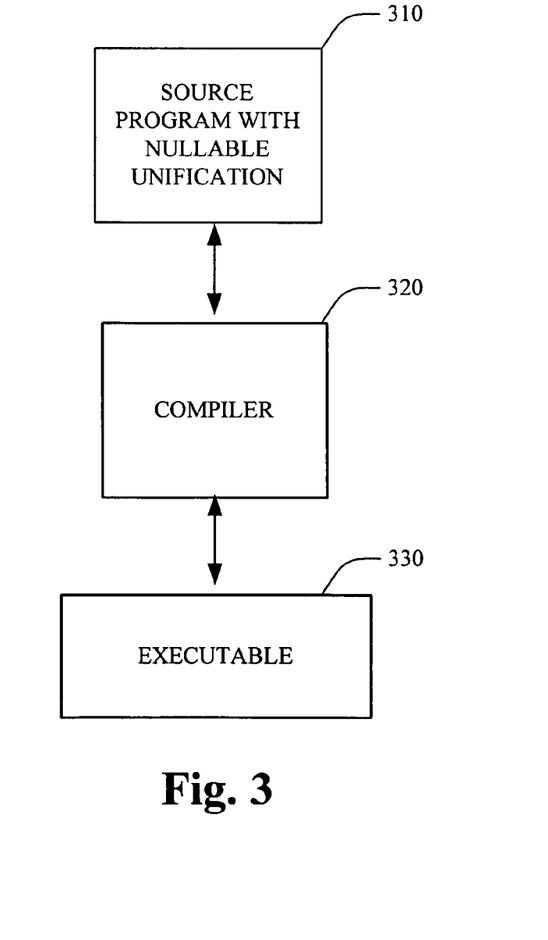
FIG. 3 illustrates a programming environment with source program that supports nullable unification.

FIG. 3 illustrates, a programming environment 300 with source program 310 that supports nullable unification. Such can supply an operator that adds a level of nullability (and removes such nullability) that is introduced without a mention of the actual type, to steer overloading in a precise manner. This level of nullability can enable a Nullable (Of T) as a static type for both value types, and reference types. The system 300 includes a source program 310 that can be developed, designed, or edited by an Integrated Development Environment (IDE). The IDE can be associated with a more elaborate programming station such as a developer studio application for example, or associated with a more basic tool such as a code text editor, for example. A compiler 320 processes the source program according to well-known compilation techniques and in view of the nullable operator to produce executable code 330 for a computer.

Figure 4:
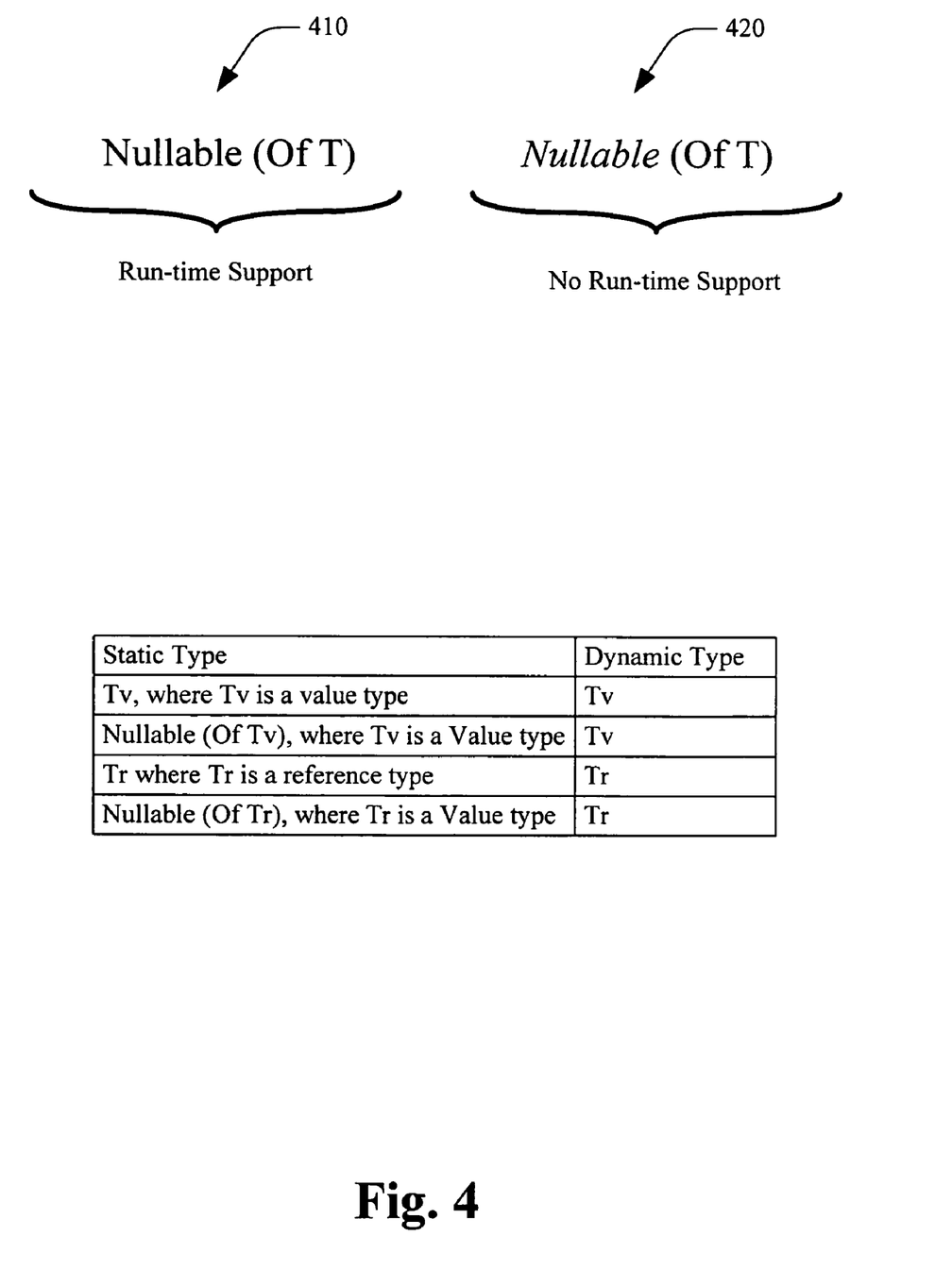
FIG. 4 illustrates two different representations for Nullable (Of T), to indicate availability for runtime support, and lack thereof.

FIG. 4 illustrates two different representations for Nullable (Of T), 410, 420 to indicate availability for runtime support, and lack thereof. When no runtime support is available, a compiler can trace nullability representation if T is a reference Type. If T is as a value type the following representations can be supplied:

$$\frac{E \text{ As } Tv}{E? \text{ As Nullable(of } Tv)} \text{ and also}$$

$$\frac{E \text{ As Nullable(of } Tv)}{E! \text{ As } Tv}$$

Figure 5:
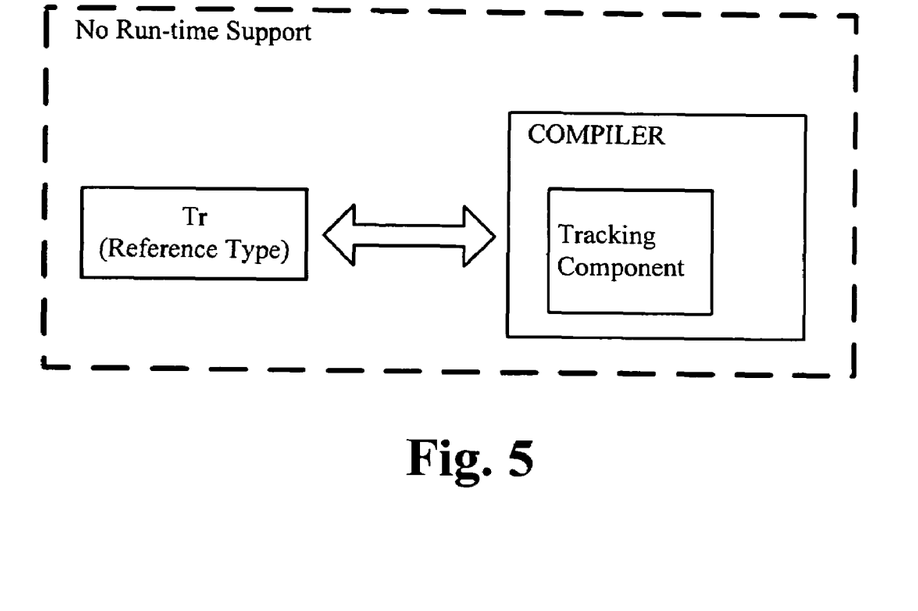
FIG. 5 illustrates a compiler with a tracking component that can trace nullability representation.

(wherein, if T is value type representation of "?" is as Nullable.) As stated, if T is a reference type, then the compiler tracks the Nullable (e.g., via metadata, special metadata and the like) with no different runtime representation. If $$\frac{E \text{ As } Tr}{E? \text{ As Nullable(of } Tr)},$$

then run-time type is Tr and the compiler maintains that it is nullable, and the type is erased to reference type (As Nullable (of Tr) indicates an erasable representation), and the compiler tracks that it is nullable at compile time. Accordingly, there is no uniform representation for value type and reference type, and the compiler has to know the case, as it is hard wired into the compiler when there is no run-time support. FIG. 5 illustrates a compiler 500 with a tracking component 510. As explained above, if T is a reference Type and when no runtime support is available, the tracking component 510 can trace nullability representation.

In a related aspect, if run time supported is provided, wherein typically at run time an instance of the nullable type is known, the instance type is of the form S=Nullable (Of Nullable (Of . . . (Of T)), where T≠Nullable (Of . . . ) wherein there is a number of nullables and then at some point a type that is not nullable (e.g., a reference type or a value type). If T is reference type, then when creating type S, it can be represented S=T. As such, Nullable (Of Nullable (Of Object)) =Object, wherein the nullables are removed. If T is value type, then S=Nullable (Of T), thus Nullable (Of Nullable (Of Int)=Nullable (Of Int).

As stated earlier, such requires runtime support, wherein at run time when the type is instantiated, the underlying execution mechanism knows about nullables, and can supply null unification. It is to be appreciated that a Static type Nullable (Of T) exists, but no such dynamic type nullable of (T).

Figure 6:
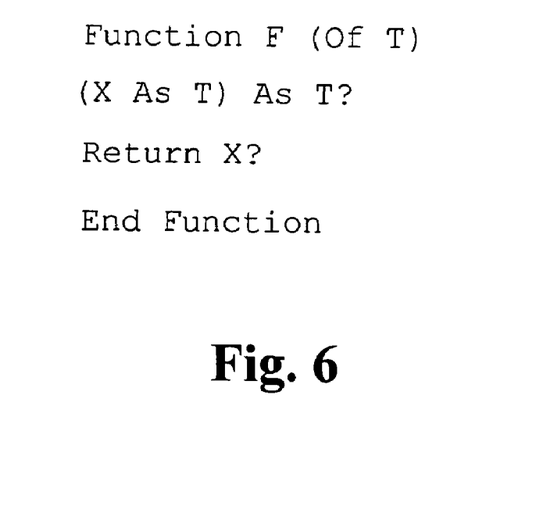
FIG. 6 illustrates a function that can be implemented in data bases for joins, wherein runtime support exists.

FIG. 6 illustrates a function that can be implemented in databases for joins, wherein runtime support exists. This can be desired to express database query operations (e.g., outer joins) that have signatures such as:

OuterJoin(Of S, T)(Source As Pair(Of Collection(Of S), Collection(Of T))) As Collection(Of Pair(Of Nullable (S), Nullable(T)))

wherein it can be mapped in the programming language to reference types. The prototypical example here is the string type. Without Nullable on reference types, it is in general impossible to distinguish between normal and nullable strings.

Figure 7:
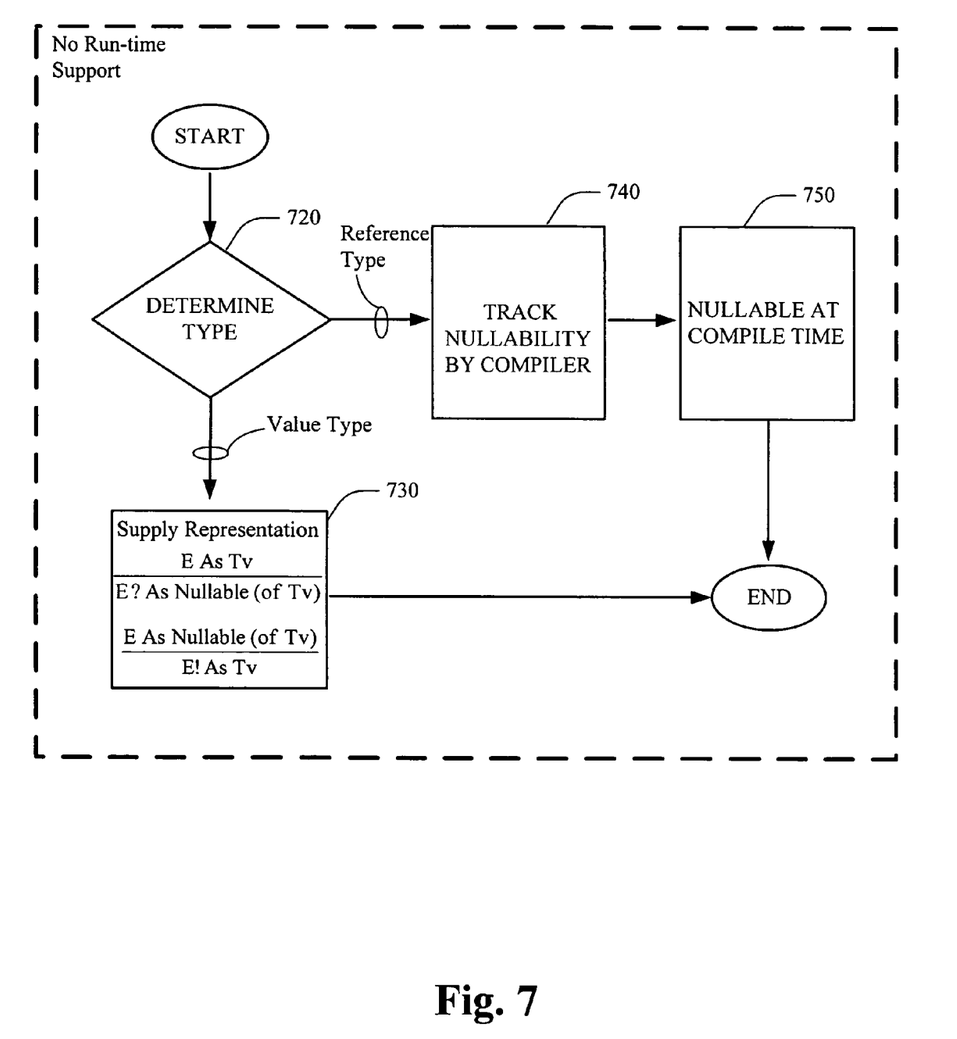
FIG. 7 illustrates a methodology for non run-time support of nullable types in accordance with an aspect of the subject innovation.

FIG. 7 illustrates a flow chart 700 for non run-time support of nullable types in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 720 a determination is made regarding the type, and if such is a reference type, the methodology proceeds to 740. At 740 the compiler can track a nullability associated with the reference type to designate nullability at compile time, at 750. Alternatively, if the determination at 720 indicates a value type, then the methodology proceeds to 730. At 730, the representation of $$\frac{E \text{ As } Tv}{E? \text{ As Nullable(of } Tv)} \text{ and also } \frac{E \text{ As Nullable(of } Tv)}{E! \text{ As } Tv}$$

can be supplied.

Figure 8:
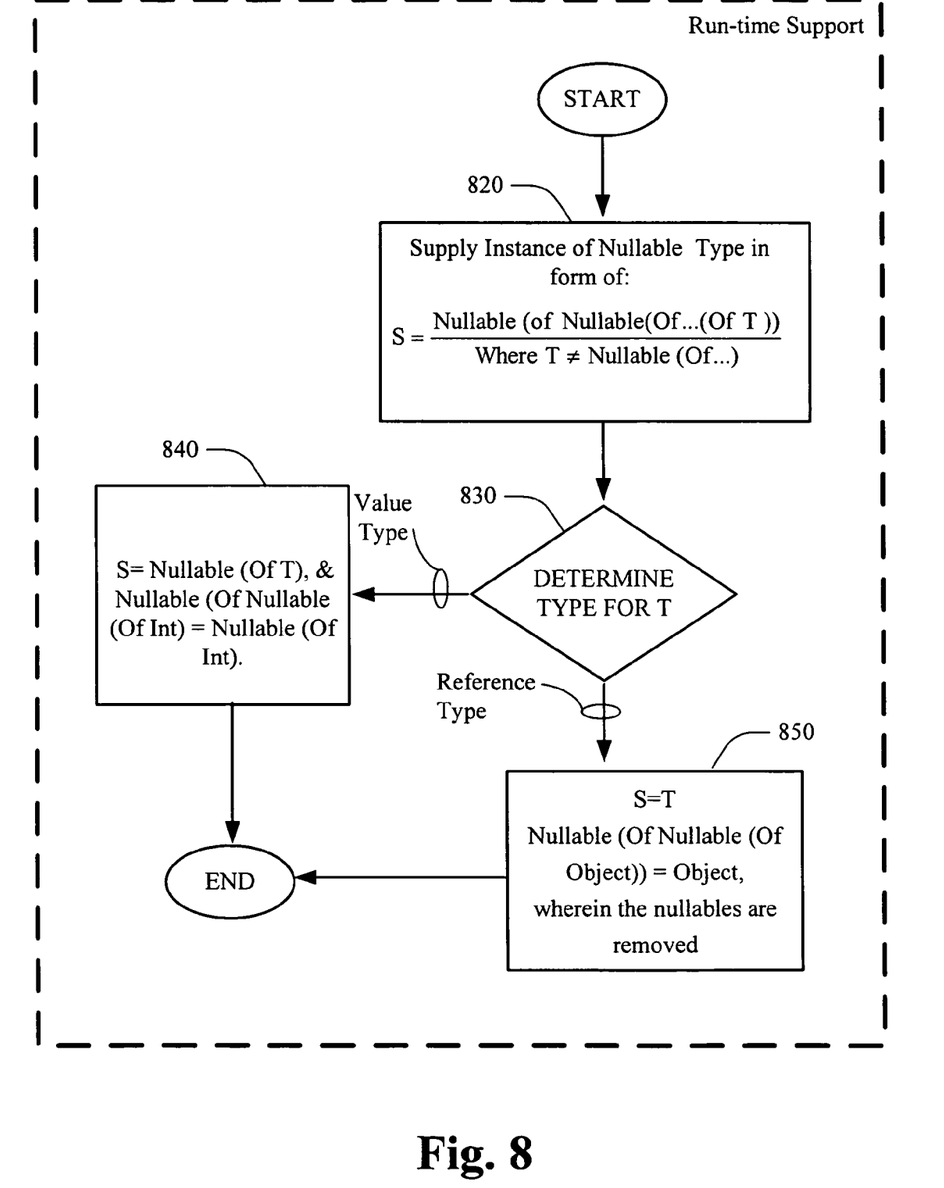
FIG. 8 illustrates a methodology for a run time support of nullable types in accordance with an aspect of the subject innovation.

FIG. 8 illustrates a flow chart 800 for a run time support of nullable types in accordance with an aspect of the subject innovation. Initially and 820 an instance of nullable types is provided in form of S=Nullable (Of Nullable (Of . . . (Of T)), where T≠Nullable (Of . . . ), wherein there is a number of nullables and then at some point a type that is not nullable (e.g., a reference type or a value type). Subsequently, and at 830 a determination is made regarding the type for T. At 850 if T is determined to be a reference type, then when creating type S, it can be represented S=T. As such, Nullable (Of Nullable (Of Object))=Object, wherein the nullables are removed. Alternatively, and at 840 if T is value type, then S=Nullable (Of T), thus Nullable (Of Nullable (Of Int)=Nullable (Of Int).

Figure 9:
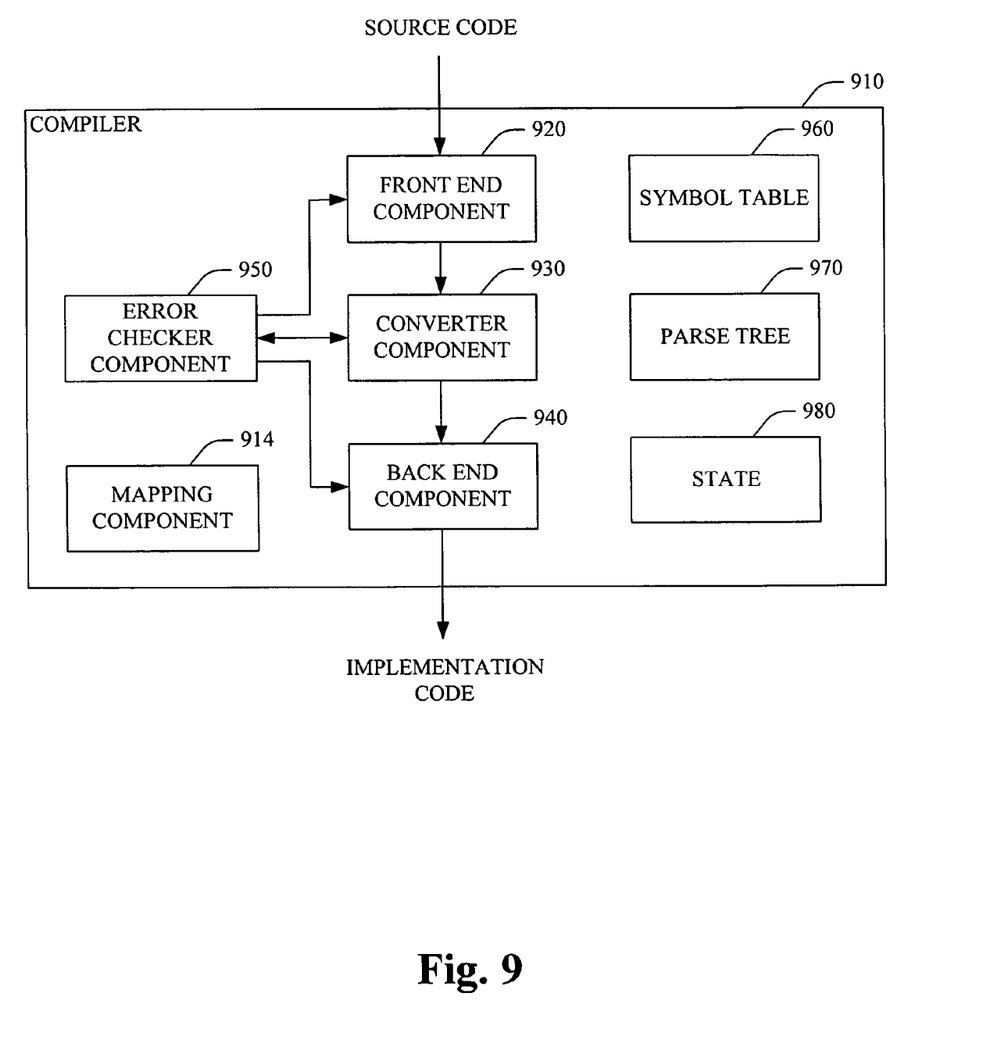
FIG. 9 is a block diagram depicting a compiler environment utilized to implement the nullability unification of the subject innovation.

FIG. 9 is a block diagram depicting a compiler environment 900 that can be utilized to implement the nullability unification of the subject innovation. The compiler environment 900 includes a compiler 910 including a mapping component 914, a front-end component 920, a converter component 930, a back-end component 940, an error checker component 950, a symbol table 960, a parse tree 970, and state 980. The compiler 910 accepts source code as input and can produce implementation code as output. The input can include but is not limited to programmatic expressions as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 910 can accept as input a file having source code associated with processing of a sequence of elements. The source code may include various expressions and associated functions, methods and/or other programmatic constructs. The compiler 910 can process source code in conjunction with one or more components for analyzing constructs and generating or injecting code.

A front-end component 920 reads and performs lexical analysis upon the source code. In essence, the front-end component 920 reads and translates a sequence of characters (e.g., alphanumeric) in the source code into syntactic elements or tokens, indicating constants, identifiers, operator symbols, keywords, and punctuation among other things.

The converter component 930 parses the tokens into an intermediate representation. For instance, the converter component 930 can check syntax and group tokens into expressions or other syntactic structures, which in turn coalesce into statement trees. Conceptually, these trees form a parse tree 970. Furthermore and as appropriate, the converter module 930 can place entries into a symbol table 930 that lists symbol names and type information used in the source code along with related characteristics.

A state 980 can be employed to track the progress of the compiler 910 in processing the received or retrieved source code and forming the parse tree 970. For example, different state values indicate that the compiler 910 is at the start of a class definition or functions, has just declared a class member, or has completed an expression. As the compiler progresses, it continually updates the state 980. The compiler 910 may partially or fully expose the state 980 to an outside entity, which can then provide input to the compiler 910.

Based upon constructs or other signals in the source code (or if the opportunity is otherwise recognized), the converter component 930 or another component can inject code corresponding to facilitate efficient and proper execution. Rules coded into the converter component 930 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 960 and the parse tree 970, a back-end component 940 can translate the intermediate representation into output code. The back-end component 940 converts the intermediate representation into instructions executable in or by a target processor, into memory allocations for variables, and so forth. The output code can be executable by a real processor, but output code that is executable by a virtual processor can also be provided.

Furthermore, the front-end component 920 and the back end component 940 can perform additional functions, such as code optimization, and can perform the described operations as a single phase or in multiple phases. Various other aspects of the components of compiler 910 are conventional in nature and can be substituted with components performing equivalent functions. Additionally, at various stages during processing of the source code, an error checker component 950 can check for errors such as errors in lexical structure, syntax errors, and even semantic errors. Upon detection error, checker component 950 can halt compilation and generate a message indicative of the error.

Figure 10:
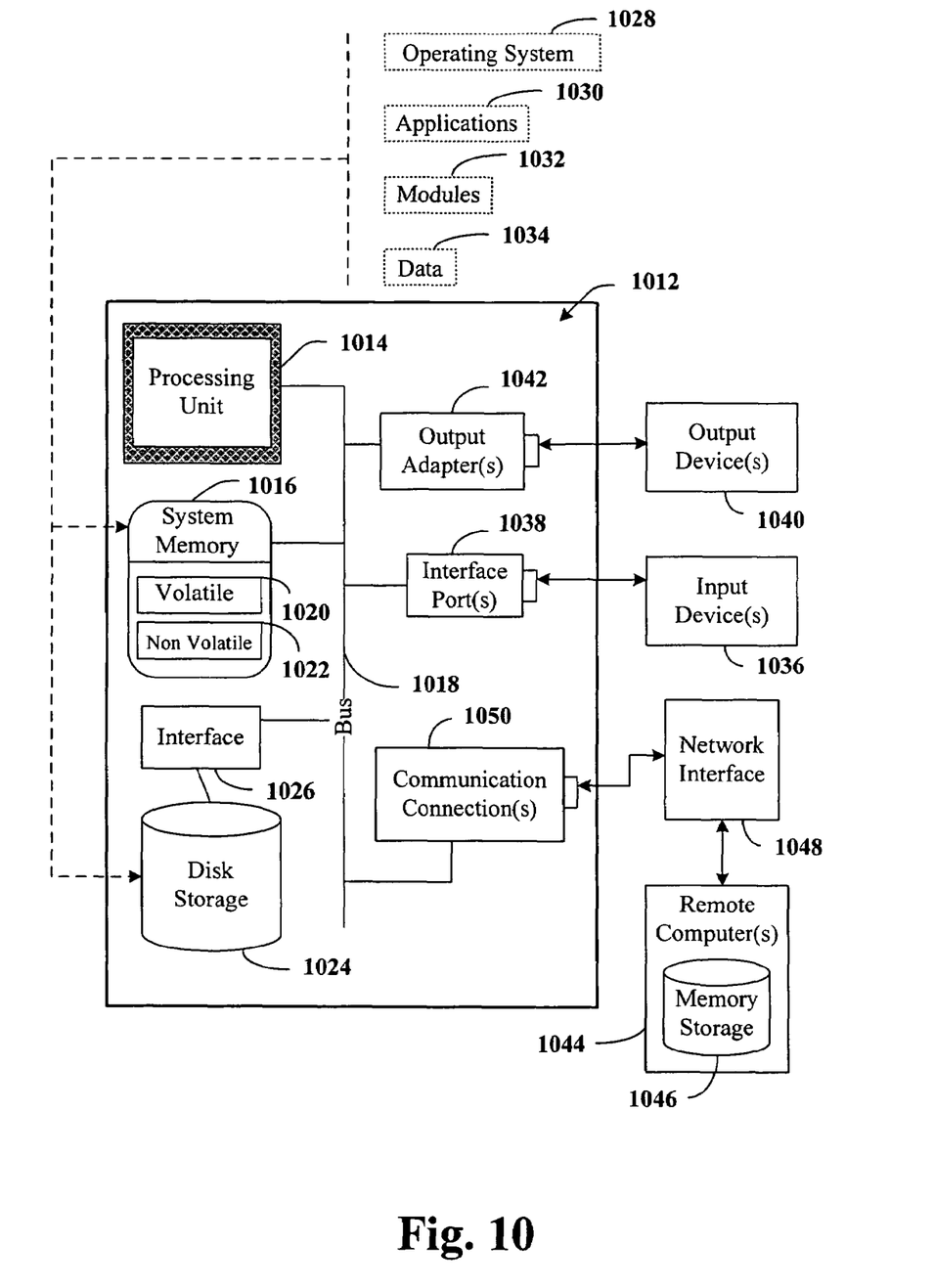
FIG. 10 illustrates an exemplary environment for implementing various aspects of the subject innovation.
Figure 11:
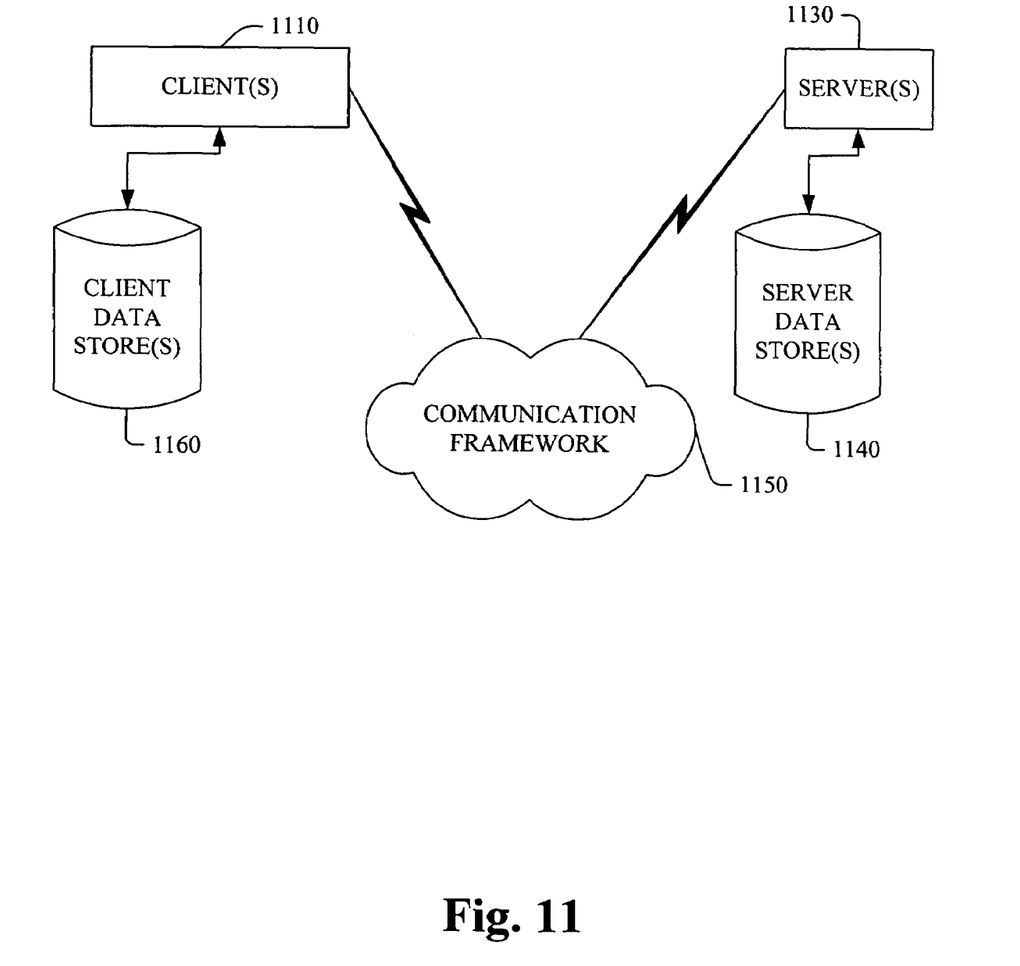
FIG. 11 is a schematic block diagram of an additional-computing environment that can be employed to implement a null unification of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed to implement a null unification of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system to enhance compiler static overload resolution, comprising a processor for executing the following computer executable components operable with a compiler that tracks nullability representation for a reference type when no run time support is supplied, wherein the nullability tracking is implemented with;

a null unification component for static types to designate nullability of the static types, wherein the static types may be any of references or values, the unification component operating with nullability rules expressed via structured representation including operators to support the compiler;

an operator that adds a level of nullability, wherein the operator that adds a level of nullability operates on both a reference type and a value type, wherein when the type is a value type, a nullability rule for expression E is represented by $$\frac{E \text{ As } Tv}{E? \text{ As Nullable(of } Tv)}.$$

wherein "?" is the operator that adds a level of nullability to a value type such that nullability of expression E as tracked by the compiler is represented as "E?" defined as "Nullable" in function of the type value Tv; and an operator that removes a level of nullability, wherein the operator that removes a level of nullability operates on both a reference type and a value type and wherein for a value type, a type rule is represented by $$\frac{E \text{ As Nullable(of } Tv)}{E! \text{ As } Tv}.$$

wherein "!" is the operator that removes a level of nullability to a nullable type such the nullability of expression E as tracked by the compiler is represented as "E!" defined as "Nullability removed" in function of the type value Tv, and wherein if the type is a reference type, nullability for expression E as tracked by the compiler is determined by a rule represented by $$\frac{EAsTr}{E? \text{ As Nullable (of } Tr)}.$$

where nullability of Expression E as tracked and represented as "E?" is defined as Nullable in function of the reference type Tr, or erased to said reference type.

2. The computer implemented system of claim 1, wherein nullability is tracked via metadata and special metadata.

3. The computer implemented system of claim 1, further comprises a run time support that indicates an instance type for a nullable type.

4. The computer implemented system of claim 3, wherein the instance type is of a form
S=Nullable (Of Nullable (Of... (Of T)), where T≠Nullable (Of...).

5. The computer implemented system of claim 4, wherein when T is a reference type then S=T; and
when T is a value type then S=Nullable(Of T).

6. The computer implemented system of claim 5, wherein Nullable (Of Nullable (Of Object))=Object, when nullables are removed.

7. A computer implemented method to enhance compiler static overload resolution operable with a compiler that tracks nullability representation for a reference type when no run time support is supplied, the method comprising the following computer executable acts:

introducing a null unification for both a reference type and a value type such that a null unification component operates with nullability rules expressed via structured representation including operators to support the compiler;

an operator adding a level of nullability, wherein the operator that adds level of nullability operates on both a reference type and a value type, wherein when the type is a value type, a nullability rule for expression E is represented by $$\frac{E \text{ As } Tv}{E? \text{ As Nullable(of } Tv)}.$$

wherein "?" is the operator that adds a level of nullability to a value type such that nullability of expression E as tracked by the compiler is represented as "E?" defined as "Nullable" in function of the type value Tv; and an operator removing a level of nullability, wherein the operator that removes a level of nullability operates on both a reference type and a value type and wherein for a value type, a type rule is represented by $$\frac{E \text{ As Nullable(of } Tv)}{E! \text{ As } Tv}.$$

wherein "!" is the operator that removes a level of nullability to a nullable type such the nullability of expression E as tracked by the compiler is represented as "E!" defined as "Nullability removed" in function of the type value Tv and wherein when the type is a reference type, nullability for expression E as tracked by the compiler is determined by a rule represented by $$\frac{EAsTr}{E? \text{ As Nullable (of } Tr)}.$$

where nullability of Expression E as tracked and represented as "E?" is defined as Nullable in function of the reference type Tr, or erased to said reference type.

8. The computer implemented method of claim 7 further comprising supplying a run time support for nullable types.

9. The computer implemented method of claim 8 further comprising
supplying an instance type in form of
S=Nullable (Of Nullable (Of (Of T)), where
T Nullable (Of...); and
collapsing Nullable (... Of T) to T when T is a reference type.

10. The method of claim 9 further comprising
collapsing Nullable (... Of T) to Nullable(Of T), when T is a value type.

11. The computer implemented method of claim 10 further comprising
removing nested nullables to obtain a type that is not nullable.

* * * * *

UNITED STATES PATENT AND TRADEMARK OFFICE
CERTIFICATE OF CORRECTION

| | |
|---|---|
| PATENT NO. | : 7,716,656 B2 |
| APPLICATION NO. | : 11/215178 |
| DATED | : May 11, 2010 |
| INVENTOR(S) | : Henricus Johannes Maria Meijer et al. |

It is certified that error appears in the above-identified patent and that said Letters Patent is hereby corrected as shown below:

In column 13, line 28, in Claim 3, delete "comprises" and insert -- comprising --, therefor.

In column 14, line 41, in Claim 9, delete "(Of (Of T))," and insert -- (Of... (Of T)) --, therefor.

In column 14, line 42, in Claim 9, delete "T Nullable" and insert -- T $\neq$ Nullable --, therefor.

Signed and Sealed this
Twenty-fifth Day of January, 2011

David J. Kappos
*Director of the United States Patent and Trademark Office*